(12) United States Patent
Währisch (10) Patent No.: US 12,308,726 B2
(45) Date of Patent: May 20, 2025

(54) CENTRIFUGAL POSITIVE LOCKING BRAKE AND METHOD FOR CONTROLLING SHUTTER DRIVES

(71) Applicant: JOHNSON ELECTRIC GERMANY GMBH & CO. KG, Dresden (DE)

(72) Inventor: Sten Währisch, Dresden (DE)

(73) Assignee: JOHNSON ELECTRIC GERMANY GMBH & CO. KG, Dresden (DE)

( * ) Notice: Subject to any disclaimer, the term of this patent is extended or adjusted under 35 U.S.C. 154(b) by 370 days.

(21) Appl. No.: 18/091,526

(22) Filed: Dec. 30, 2022

(65) Prior Publication Data
US 2023/0137414 A1    May 4, 2023

Related U.S. Application Data

(63) Continuation of application No. PCT/EP2021/066622, filed on Jun. 18, 2021.

(30) Foreign Application Priority Data

Jul. 3, 2020 (DE) ............ 10 2020 117 684.8

(51) Int. Cl.
*H02K 7/102* (2006.01)
*F16D 59/00* (2006.01)
(Continued)

(52) U.S. Cl.
CPC ............ *H02K 7/102* (2013.01); *F16D 59/00* (2013.01); *F16D 63/006* (2013.01); *E06B 9/72* (2013.01);
(Continued)

(58) Field of Classification Search
CPC ...... H02K 7/102; H02K 2207/03; E06B 9/72; E06B 9/80–2009/905
See application file for complete search history.

(56) References Cited

U.S. PATENT DOCUMENTS

| 7,714,685 B2 | 5/2010 | Pescheck et al. |
| 2002/0170786 A1 | 11/2002 | Bucher |
| 2019/0145472 A1 | 5/2019 | Währisch |

FOREIGN PATENT DOCUMENTS

| DE | 202004020645 U1 | 9/2005 |
| DE | 102013216410 A1 | 2/2015 |
| DE | 202017106925 U1 | 2/2018 |

OTHER PUBLICATIONS

International Search Report from corresponding PCT Application No. PCT/EP2021/066622 Oct. 6, 2021.
(Continued)

*Primary Examiner* — Ramon M Barrera
(74) *Attorney, Agent, or Firm* — Aird & McBurney LP (57) ABSTRACT

The centrifugal positive locking brake works inversely, that means, locking upon stopping and decoupling on start-up. When the drive motor is de-energized, the fixed ratchet(s) hit against at least one locking abutment on a locking disc positively fixed to the frame and lock the shutter. When voltage is applied, and with the associated quick start-up of the drive motor, the ratchet(s) disengage because of their inertia. This centrifugal positive locking brake for shutter drives is operated with a specially designed control method. After the power supply is interrupted, the ratchet(s) are drawn inward by the reloaded spring(s) so that they run against the locking abutment(s) and the shutter reliably locks in this position.

13 Claims, 4 Drawing Sheets

(51) Int. Cl.
*F16D 63/00* (2006.01)
*E06B 9/72* (2006.01)
*F16D 121/22* (2012.01)

(52) U.S. Cl.
CPC ...... *F16D 2121/22* (2013.01); *H02K 2207/03* (2013.01)

(56) References Cited

OTHER PUBLICATIONS

English Translation of DE202017106925U1 from Google Patents Dec. 29, 2022.
English Translation of DE102013216410A1 from Google Patents Dec. 29, 2022.
English Translation of DE202004020645U1 from Google Patents Dec. 29, 2022.

CENTRIFUGAL POSITIVE LOCKING BRAKE AND METHOD FOR CONTROLLING SHUTTER DRIVES

FIELD OF THE INVENTION

The invention relates to a centrifugal positive locking brake and a related method for controlling the centrifugal positive locking brake for shutter drives which, when at rest, generates a sufficient holding torque on the drive, locks the shutter securely when at rest and operates with low noise and low wear.

BACKGROUND OF THE INVENTION

In principle, a great variety of different individual technical solutions are known as active or also as passive braking systems for shutter drives. Shutter drives with active electromagnetic or electromechanical brakes consume additional energy and generate considerable switching noise when actuated. Furthermore, they also need a relatively large mounting space as can be seen, e.g. from EP 000 0002 234 245 and DE 20 2005 007 921. The advantage of passively acting braking systems is that they need no auxiliary energy and occupy a smaller mounting space.

DE 10 2005 047 296 B3 describes a centrifugal brake having a brake drum that surrounds the rotating element at least partially and at least one centrifugal block which is disposed on the rotating element and is substantially radially movable between the rotating element and an inner wall of the brake drum. An additional braking device is provided for actuation when the rotating element exceeds a predefined speed. This makes it possible to bring the rotating element rapidly to a standstill. Generally, such brakes are not used for stopping a rotational speed strongly or even rigidly, but only for limiting it. From a defined rotational speed, the centrifugal blocks start moving radially outwards from their rest position as a result of the centrifugal force acting on them. When a defined actuating speed is reached, the centrifugal blocks come in contact with the brake drum so that friction and, related to this, a braking effect occurs. In specific application cases the brake drums are also used to stop the rotating element.

From U.S. Pat. No. 4,216,848 a braking device for a rod-like element is known, where centrifugal blocks can be brought in contact with a so-called brake shoe to cause it to rotate and move axially towards the rod. During this, a brake wheel is pushed against a brake disc, finally braking the rod-like element.

DE 10 2015 106 833 A1 describes a centrifugal brake for shutter drives, having two spring elements which apply a holding force in addition to a braking force. This centrifugal brake is coupled to a drive shaft of the shutter drive and is actuated by the shutter drive motor. It is designed such that it works inversely, i.e. not braking as known with increasing speed, but instead braking with a falling speed. It has a turntable coupled with the shutter drive shaft via a shaft flange. Two or more centrifugal blocks are disposed and slidably guided in the turntable. When the shutter drive is in a de-energized state, the centrifugal blocks with their partially overarching brake blocks engage, frictionally or positively locking, with the surface of a friction ring that is fixedly disposed at the motor housing frame. When the drive motor starts, the brake blocks are released, i.e. disengaged. The radial distance of the brake blocks is maintained until the current is switched off and the drive motor comes to a standstill. Then the centrifugal blocks with the angled brake blocks are radially pulled inside by the two spring elements, acting as a reliable lock. The spring elements are dimensioned such that the brake blocks provide a sufficient holding torque. However, problems of wear may quickly occur when they are frequently actuated.

Furthermore, DE 93 13 666 U1 describes a braking device for an electric motor, in particular a tubular electric motor provided with a purely mechanical brake with at least one brake pad, brake blocks and elastic means. When the brake is at rest, the brake blocks are pushed against a brake pad, using spring force. The brake is provided with flyweights which move the elastic means out of their braking position under the influence of the centrifugal force. At rest (de-energized), this brake is active, and when the electric motor starts, the brake is released by the action of centrifugal force. The brake blocks are specifically configured in the form of crown segments which are hinged at one end to a brake block carrier. The elastic means used are arc-shaped springs. This braking device as a frictional blocking brake is constructively relatively long in the axial direction, comprising many individual parts with a complex structure, and therefore requires considerable mounting space.

A related centrifugal positive blocking brake for shutter drives is already described in DE 10 2017 126 807, in which a turntable is coupled to a drive shaft of a drive motor, whereby a spring element is supported and guided centrifugally in a recess of the turntable, inside of which a spring is fitted. Either side of the spring is connected with a radially movable engaging tab element which is guided in the turntable. Two different radially acting abutments are disposed on the spring element and are movable towards recesses in the turntable. The engaging tab element has at least one engaging tab pointing radially inwards and a centrifugal block is fastened to each of the engaging tab elements. In the de-energized state of the drive motor, the engaging tab elements together with the centrifugal blocks disposed on them engage into detents of a frame-fixed detent disc with a least one engaging tab in a frictionally and positively locking manner. The number of detents is identical with or an integer multiple of the detent positions of the drive motor. When voltage is applied and the drive motor starts, the engaging tabs disengage. The individual centres of mass of all radially movable parts are on one symmetry axis. The disadvantage of this technical solution is that a certain amount of time is required to release the positive blocking mechanism, various avoidable noises still occur and it sometimes has to be activated several times in order to release the centrifugal blocks from the small, tight detents. In addition, a high level of manufacturing accuracy and coordinated fitting capability of the detents and the engaging tab are required in order to be able to permanently guarantee a constant holding torque using the positive blocking mechanism. In addition, the engaging tab or detents can suffer premature or different wear, as a result of which different holding torques can occur, ultimately reducing the service life.

SUMMARY OF THE INVENTION

The object of the invention is to create an improved centrifugal positive locking brake that is constructively less complex to make and a related method for controlling the centrifugal positive locking brake for shutter drives, which is extremely small in size and very simply designed, causes definitively safer, irreversible locking of the shutter when the drive is de-energized, releases the positive locking brake reliably when the drive is energized, operates passively without any additional auxiliary energy to be provided, generates little or no disturbing noise during operation and is designed to be low-wear.

According to the invention, the object is achieved by the characteristics of the first and eighth patent claims. Further purposeful embodiments of the invention are the object of the further dependent claims. In the novel centrifugal positive locking brake for a shutter drive with standard centrifugal blocks, at least one spring is located inside in a tubular housing. The shutter, as known, is driven by a drive motor located in the tubular housing via a drive shaft and in terms of working principle is designed to act inversely, that means, locking upon stopping and decoupling on start-up. According to the invention, a standard turntable is coupled to the drive shaft of the drive motor and in the turntable there are one or more guides (guides here can be, for example, one or more groove-like recesses). In these guides in the turntable, if there is one guide, a spring element is centrifugally guided inside and, for multiple guides, multiple spring elements are centrifugally guided inside them, each with one or more preloaded springs inside. Each disposed, preloaded spring is connected with a radially movable locking element which is guided in the turntable. Radially working internal abutments are disposed on each spring element, which restrict the radial mobility of the spring elements internally or externally. The spring element(s) are designed to be movable in the guides, for example preferably in groove-like recesses in the turntable. In a novel way, at least one ratchet is disposed as a locking element on one or each spring element. A centrifugal block is fixed to each ratchet, which are made from one part or if applicable also from two centrifugal block parts. One, two or more locking abutments are fixed to the locking disc. When the drive motor is de-energized, the ratchet(s) hit(s) against at least one locking abutment on a frame-fixed locking disc in a positively locking manner, locking the shutter. The diameter of the locking abutment(s) can be larger or smaller than the diameter of the locking disc so that a radially aligned abutment surface is created at a specific height on each locking abutment on both sides. When voltage is applied and the specially designed drive motor starts up fast, the ratchet(s) disengage(s) because of the centrifugal force due to inertia as a result of the correspondingly arranged and dimensioned centrifugal blocks or centrifugal block parts, for as a result of the centrifugal force a fast radial outward movement occurs and the ratchet(s) are moved outward so that they remain disengaged and can be passed by the locking abutment(s). Then the drive motor can move the shutter. The radial distance of the ratchet(s) to the locking abutment(s) is maintained until the current is switched off and the drive motor comes to a standstill. Then the ratchet(s) and the connected centrifugal blocks or centrifugal block parts are immediately drawn radially inward by the correspondingly preloaded spring attached to each ratchet and the ratchet(s) hit against the locking abutment(s). As a result of this form fit, further movement of the shutter is prevented and it is locked precisely, reliably and permanently in a specific position until the next activation. This constructive configuration of the centrifugal positive locking brake for shutter drives is operated with a specially designed control method. With this novel method, the unlocking of the positive locking brake according to the invention takes place either as a result of an extremely accelerated start-up movement of turntable using a targeted specific control of the drive motor. Or, if required, depending on the position of the ratchet(s) there is an accelerated reversal of direction of the drive motor. A specific drive motor management is required for this. Here, the ratchet(s) with the centrifugal blocks or the centrifugal block parts arranged on them are moved radially outward and disengage. The shutter can then be moved as long as the power supply is not interrupted and because of the inertia the ratchet(s) cannot be moved inward back into the locking position and they remain in the disengaged position until the shutter stops. After the power supply is interrupted, the ratchet(s) are drawn inward by the reloaded spring(s) so that these run against the locking abutment(s) and the shutter reliably locks in this position.

This centrifugal positive locking brake is designed to be extremely small in size, constructively very simple and low-noise and is characterized by a long service life. When the drive motor is de-energized, it ensures a permanent, accurate, fast, form-fitting locking of the shutter and causes the centrifugal positive locking brake to release fast when the drive is energized. It operates reliably in a passive manner and even without requiring any auxiliary energy to be additionally provided, while offering minimized power consumption of the drive motor. Because of the new control method, the centrifugal positive locking brake can be operated simply, optimally and permanently securely.

A specific advantage is when there are two or four locking abutments on the locking disc for the centrifugal positive locking brake for shutter drives. In these specific designs, they are distributed symmetrically around the circumference of the locking disc, i.e. if there are two locking abutments, they are positioned directly opposite each other, and for four locking abutments they are each offset by 90°. There are advantages here in accuracy of positioning. In principle, a design with only one or three locking abutments on the locking disc is possible.

It is sensible if the centrifugal positive locking brake for shutter drives has two or four ratchets in or on the turntable precisely centrally symmetrical and equally distributed on the radius in respect of one or more centrifugal springs. This is an advantage, in particular, if they interact with two or four locking abutments arranged on the locking disc. This increases the positioning accuracy of the shutter. In principle, however, a design with only one ratchet combined with several locking abutments is possible.

In a particularly beneficial design of the centrifugal positive locking brake for a shutter drive with centrifugal blocks, a central spring element is centrifugally guided in a guide, for example a groove-like recess in turntable. Inside this a preloaded spring working on two sides is disposed. The central spring element consists of the spring and two embracing spring forks, in which the spring is fastened and pre-tensioned. These spring forks with the centrically disposed spring are supported and guided radially movably in the groove-like recess. Radially outwards, the spring forks are preferably wedge-shaped. Theses wedges serve as an abutment, acting as a radial centring stop in connection with equally wedge-shaped surfaces formed in the turntable towards the outer edge. These surfaces run towards each other to cause self-centring and fixing. The other abutment formed in axial direction serves as an end abutment, also limiting the outward radial movement of all radially movable parts both outward and inward, during the entire operation of the drive motor. The centrifugal forces acting outwardly during motor operation cause fixing as well as accurate positioning so that no vibrations of radially movable parts can occur. This avoids unwanted noise. Coupled to the spring forks on either side, i.e. to the spring ends of spring, is a radially movable ratchet being guided in the turntable. Each ratchet has a centrifugal block fastened to it. In combination with two ratchets, it is sensible if two symmetrically opposite locking abutments are arranged on the locking disc. When the drive motor is de-energized, the two ratchets then positively engage the two locking abutments on the locking disc fitted securely to the frame, whereby an abutment surface arises on each side of each locking abutment at a specific height. With a voltage applied and an accelerated, fast start-up of the drive motor, the two ratchets are radially moved outward by the centrifugal force so that they simultaneously disengage. The individual centres of mass of all radially movable parts here are arranged symmetrically to each other and are on one symmetry axis. Overall this leads to a very low-noise operation of a shutter and increases the service life, because as a result of the two ratchets and their simultaneous stop on the locking abutments the forces decrease and the wear on the locking abutments and ratchets decreases. In addition, there is then always enough space for the starting and lifting of the ratchets.

A simple construction and function is realisable if, for the centrifugal positive locking brake for shutter drives according to claim, the diameter of the ratchets, i.e. their internal diameter, is greater than the diameter of locking disc.

Additionally, the locking abutment surfaces of the locking abutment(s) and the ratchet(s) can be designed such for the centrifugal positive locking brake for shutter drives that dovetail operation occurs. This leads to the ratchet(s) being drawn radially inward to the locking abutment(s) until they are on the outside surface of locking disc and thus remain permanently secured in this position.

As another measure to reduce noise for the centrifugal positive locking brake for shutter drives, the locking abutment surfaces of the locking abutment(s) and or of the ratchet(s) are noise-insulated. This can be realized easily by coating one or both surfaces that impact each other with noise-insulating materials or by applying noise-insulating surface materials.

In a specific design of the method according to the invention using a centrifugal positive locking brake for shutter drives, if turntable is blocked, it is initially accelerated by drive motor against the selected direction until the ratchet(s) lift off, then there is a quick reversal of direction by switching the drive motor as quickly as possible so that the ratchet(s) with the centrifugal blocks or centrifugal block parts disposed on them remain open during the switching and during movement because of their inertia until the shutter is stopped.

In another variant of the method using a centrifugal positive locking brake for shutter drives, the drive motor initially rotates turntable slowly against the selected direction. Then, before or at the latest upon reaching another abutment the drive motor is switched, and then turntable is accelerated by a specific control of drive motor with high acceleration in the direction of movement so that the ratchet(s) and the centrifugal blocks or centrifugal block parts are moved radially outward by the centrifugal force, rise and remain open until the shutter is stopped.

A design is also conceivable, where for the method using a centrifugal positive locking brake for shutter drives the drive motor slowly turns the turntable against the selected direction of movement until the turntable is blocked by the abutment of the ratchet(s) engaging in another abutment, then the drive motor is switched and only then is the turntable accelerated with high acceleration in the direction of movement. Here the ratchet(s) and the centrifugal blocks or centrifugal block parts are moved radially outward by the centrifugal force and remain opened during the movement process until the shutter is stopped.

If a specially designed drive motor is installed in the shutter and the rotor of the drive motor can be turned to a specific position by an applied current pattern, the ratchet(s) can also be moved by this control process to a defined start position using a centrifugal positive locking brake, then making it directly possible to move turntable in a direction with high acceleration immediately without switching, whereby the ratchet(s) and the centrifugal blocks or centrifugal block parts radially lift off so far by the centrifugal force that the ratchet(s) cannot hit a locking abutment and remain open while the shutter is being operated until the shutter stops.

In a special design of the method using a centrifugal positive locking brake for shutter drives, first of all, while turntable is at rest, the position of the ratchet(s) is determined before or while the drive motor is energized, although it is not yet started. Then, depending on the determined position, i.e. if the distance from the locking abutment is correspondingly sufficient and the ratchet(s) can lift off radially before the locking abutment is reached in the direction of movement when the turntable is rotating, the turntable accelerates directly in the direction of movement with high acceleration because of the appropriate control of the drive motor so that the shutter can be moved in the direction of movement without the ratchet(s) engaging. Or, depending on the position of the at-rest ratchet(s), i.e. if the distance from the locking abutment is not enough, it first rotates against the direction of movement, then the drive motor is switched upon reaching a specific position, the turntable is accelerated in the direction of movement with high acceleration, whereby the ratchet(s) and the centrifugal blocks or centrifugal block parts lift off radially and remain open and the locking abutment(s) are permanently passed during the movement process until the movement process of the shutter is stopped and the ratchet(s) re-engage.

BRIEF DESCRIPTION OF THE DRAWINGS

The invention shall be explained in detail in one exemplary embodiment by reference to FIGS. 1 to 4.

DETAILED DESCRIPTION OF THE PREFERRED EMBODIMENTS

Figure 1:
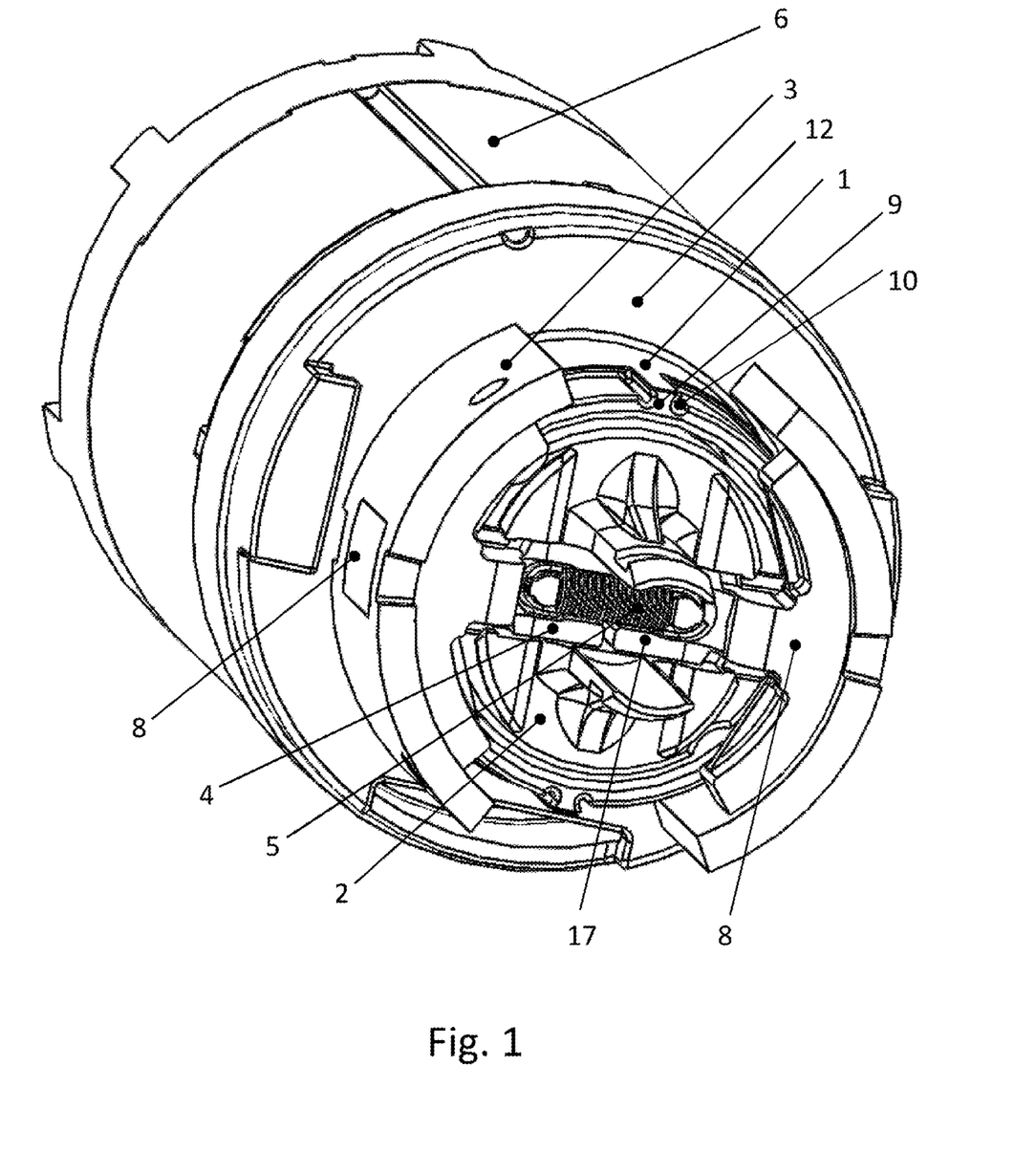
FIG. 1 shows an oblique 3D view of the centrifugal positive locking brake.

FIG. 1 shows the construction of a centrifugal positive locking brake in an oblique 3D view. The central spring element 4 is supported and guided centrifugally in a groove-like guide, for example a recess in a turntable 2 which is coupled with the drive shaft of the drive motor 6. The standard turntable 2 is coupled to the drive shaft 7 (see in FIG. 4) of the drive motor 6 and in the turntable 2 there are one or more guides (guides here can be, for example, one or more groove-like recesses). In these guides in the turntable 2, if there is one guide, a spring element 4 is centrifugally guided inside and, for multiple guides, multiple spring elements 4 are centrifugally guided inside them, each with one or more preloaded springs 5 inside. Each disposed, preloaded spring 5 is connected with a radially movable locking element which is guided in the turntable 2. Radially working internal abutments 14, 15 (see in FIGS. 2 and 3) are disposed on each spring element 4, which restrict the radial mobility of the spring elements 4 internally or externally. The spring element(s) 4 are designed to be movable in the guides, for example preferably in groove-like recesses in the turntable 2. In a novel way, at least one ratchet 8 is disposed as a locking element on one or each spring element 4. A centrifugal block 3 is fixed to each ratchet 8, which are made from one part or if applicable also from two centrifugal block parts 11. One, two or more locking abutments 9 are fixed to the locking disc 1. When the drive motor 6 is de-energized, the ratchet(s) 8 hit(s) against at least one locking abutment 9 on a frame-fixed locking disc 1 in a positively locking manner, locking the shutter. The diameter of the locking abutment(s) 9 can be larger or smaller than the diameter of the locking disc 1 so that a radially aligned abutment surface is created at a specific height on each locking abutment 9 on both sides. When voltage is applied and the specially designed drive motor 6 starts up fast, the ratchet(s) 8 disengage(s) because of the centrifugal force due to inertia as a result of the correspondingly arranged and dimensioned centrifugal blocks or centrifugal block parts 11, for as a result of the centrifugal force a fast radial outward movement occurs and the ratchet(s) 8 are moved outward so that they remain disengaged and can be passed by the locking abutment(s) 9. Then the drive motor 6 can move the shutter. The radial distance of the ratchet(s) 8 to the locking abutment(s) 9 is maintained until the current is switched off and the drive motor 6 comes to a standstill. Then the ratchet(s) 8 and the connected centrifugal blocks 3 or centrifugal block parts 11 are immediately drawn radially inward by the correspondingly preloaded spring 5 attached to each ratchet 8 and the ratchet(s) 8 hit against the locking abutment(s) 9. As a result of this form fit, further movement of the shutter is prevented, and it is locked precisely, reliably and permanently in a specific position until the next activation. This constructive configuration of the centrifugal positive locking brake for shutter drives is operated with a specially designed control method. With this novel method, the unlocking of the positive locking brake according to the invention takes place either as a result of an extremely accelerated start-up movement of turntable 2 using a targeted specific control of the drive motor 6. Or, if required, depending on the position of the ratchet(s) 8 there is an accelerated reversal of direction of the drive motor 6. A specific drive motor management is required for this. Here, the ratchet(s) 8 with the centrifugal blocks 3 or the centrifugal block parts 11 arranged on them are moved radially outward and disengage. The shutter can then be moved as long as the power supply is not interrupted and because of the inertia the ratchet(s) 8 cannot be moved inward back into the locking position and they remain in the disengaged position until the shutter stops. After the power supply is interrupted, the ratchet(s) 8 are drawn inward by the reloaded spring(s) 5 so that these run against the locking abutment(s) 9 and the shutter reliably locks in this position.

The preloaded spring 5 is disposed inside the central spring element 4 and is located inside in a tubular housing 13. The spring 5 is radially guided by means of two opposite embracing spring forks 17 which are movably guided. The spring forks 17 together with the spring 5 which is attached in a preloaded manner to their insides form the radially movable central spring element 4. Each of the two spring forks 17 ends in a shank of less width than the widths of the spring forks 17. This shank is supported and guided in a narrower recess of the turntable 2. The width of the spring forks 17 tapers by means of slanted surfaces to form a kind of wedge-shaped shoulder. This wedge-shaped shoulder abuts against likewise wedge-shaped surfaces, i.e. abutments, in the turntable 2. The ratchet 8 is disposed on the end of the shank radially outward on two opposing shanks. These are supported and guided radially movably in the narrower recess of turntable 2. Single-part centrifugal blocks 3 are connected to the two symmetrically opposing ratchets 8. They can either have single sections or two sections. The mass of each ratchet 8 including the accompanying centrifugal block 3 is determined by the centrifugal forces acting in the system, the preloaded spring 5 is designed and preloaded correspondingly. During a rotational movement, the centrifugal forces generated exceed the spring forces and the ratchets 8 move radially, including with the connected centrifugal blocks 3. Two symmetrically opposite locking abutments 9 are disposed on the locking disc 1, which are connected via the locking disc 1 to the frame 12. The stator of the drive motor 6 is also fastened within the frame 12. Disposed in its centre, the turntable 2 has a drive shaft extension, at which further components such as an encoder may be disposed. The tubular housing 13 of the shutter, which protects and covers the centrifugal positive locking brake is not shown in FIG. 1. The shutter, as known, is driven by a drive motor 6 located in the tubular housing 13 via a drive shaft 7 and in terms of working principle is designed to act inversely, that means, locking upon stopping and decoupling on start-up. So that the ratchets 8 can engage fully against the radial surfaces of the locking abutments 9, there are typically additional recesses 10 at these locations at the transition of the outside surface of the locking disc 1 to the radially outward-protruding surfaces of the locking abutments 9. In addition, these recesses bring advantages in the production of the locking disc 1. A specific advantage is when there are two or four locking abutments 9 on the locking disc 1 for the centrifugal positive locking brake for shutter drives. In these specific designs, they are distributed symmetrically around the circumference of the locking disc 1, i.e. if there are two locking abutments 9, they are positioned directly opposite each other, and for four locking abutments 9 they are each offset by 90°. There are advantages here in accuracy of positioning. In principle, a design with only one or three locking abutments 9 on the locking disc 1 is possible.

Figure 2:
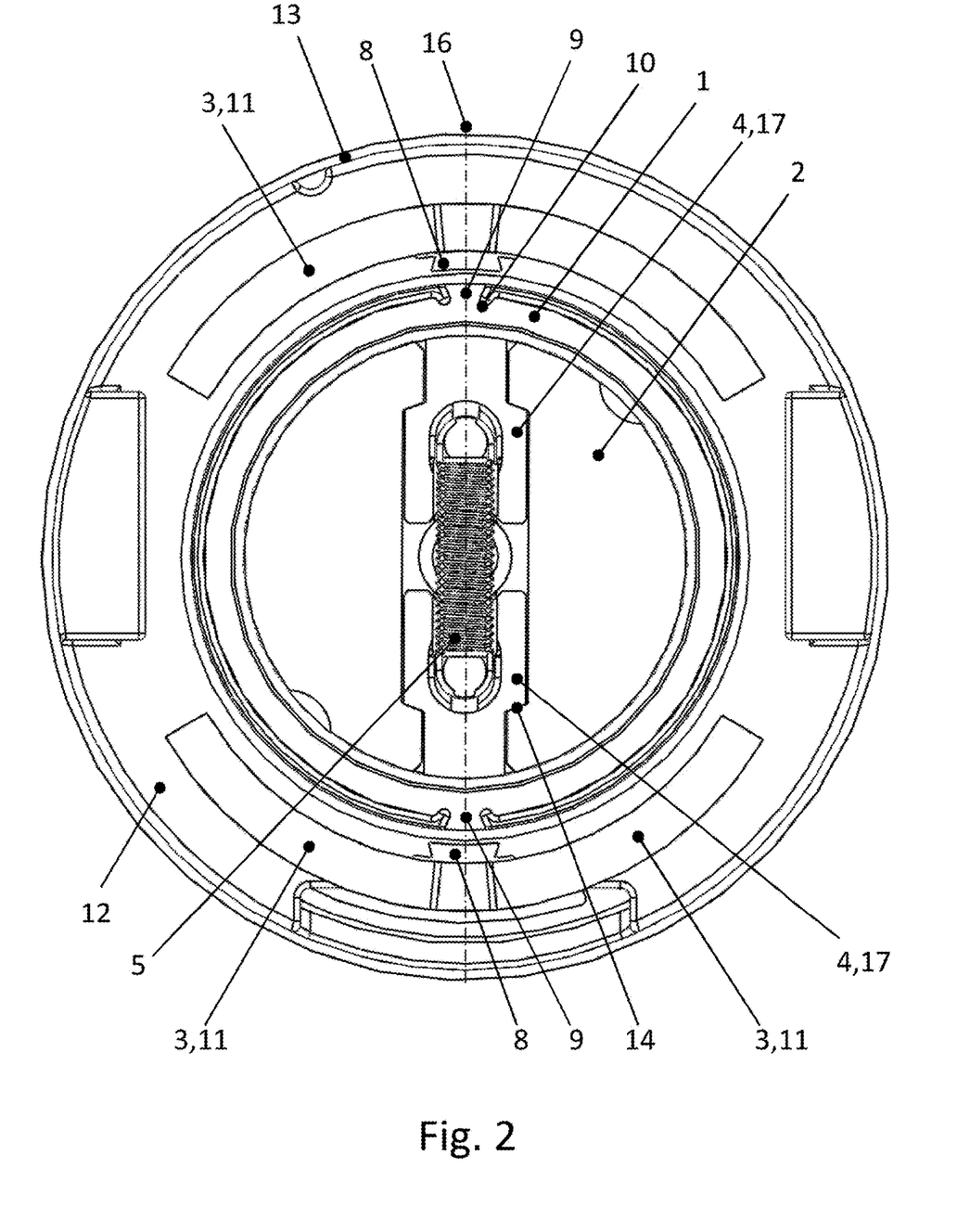
FIG. 2 shows a sectional front view of the centrifugal positive locking brake in open position.

FIG. 2 shows a front view, in open position, of the centrifugal positive locking brake, including the surrounding tubular housing 13 while moving a shutter. The two exactly symmetrically opposite ratchets 8 (therefore drawing of the symmetry axis 16) with the centrifugal blocks 3 or the centrifugal block parts 11 attached to them are disengaged due to the rotary movement of the energized drive motor 6 and the acting centrifugal forces. That is, the centrically disposed preloaded spring 5 of the central spring element 4 is elongated. The two spring forks 17 have moved so far outwards that the two wedge-shaped shoulders forming the abutment 14 press against the slanted surfaces of the turntable 2, positioning all movable parts centred, securing them and restricting the radial movement of the ratchets 8 with the centrifugal blocks 3. This prevents unwanted vibration of all the radially movable parts of the centrifugal positive locking brake. This locking abutment also serves as an end abutment for all parts. In this open position, the ratchets 8 do not hit the locking abutments 9 of the locking disc 1, which is preferably materially connected to the frame 12. A multi-part design is conceivable. The inner diameter of the ratchets 8 in centrifugal force position is greater than the outer diameter of the locking abutments 9. The surfaces of the locking abutments 9 and the ratchets 8 are inclined in this design so that dovetail operation occurs upon engaging and the ratchets 8 are drawn radially inward upon contact so that a secure, permanent locking of the shutter is achieved. It is sensible if the centrifugal positive locking brake for shutter drives has two or four ratchets 8 in or on the turntable 2 precisely centrally symmetrical and equally distributed on the radius in respect of one or more centrifugal springs 4. This is an advantage, in particular, if they interact with two or four locking abutments 9 arranged on the locking disc 1. This increases the positioning accuracy of the shutter. In principle, however, a design with only one ratchet 8 combined with several locking abutments 9 is possible.

In a particularly beneficial design of the centrifugal positive locking brake for a shutter drive with centrifugal blocks, the central spring element 4 is centrifugally guided in a guide, for example a groove-like recess in the turntable 2. Inside this the preloaded spring 5 working on two sides is disposed. The central spring element 4 consists of the spring 5 and two embracing spring forks 17, in which the spring 5 is fastened and pre-tensioned. These spring forks 17 with the centrically disposed spring 5 are supported and guided radially movably in the groove-like recess. Radially outwards, the spring forks 17 are preferably wedge-shaped. Theses wedges serve as the abutment 14, acting as a radial centring stop in connection with equally wedge-shaped surfaces formed in the turntable 2 towards the outer edge. These surfaces run towards each other to cause self-centring and fixing. The other abutment 15 formed in axial direction serves as an end abutment, also limiting the outward radial movement of all radially movable parts both outward and inward, during the entire operation of the drive motor 6. The centrifugal forces acting outwardly during motor operation cause fixing as well as accurate positioning so that no vibrations of radially movable parts can occur. This avoids unwanted noise. Coupled to the spring forks 17 on either side, i.e. to the spring ends of spring 5, is a radially movable ratchet 8 being guided in the turntable 2. Each ratchet 8 has the centrifugal block 3 fastened to it. In combination with two ratchets 8, it is sensible if two symmetrically opposite locking abutments 9 are arranged on the locking disc 1. When the drive motor 6 is de-energized, the two ratchets 8 then positively engage the two locking abutments 9 on the locking disc 1 fitted securely to the frame, whereby an abutment surface arises on each side of each locking abutment 9 at a specific height. With a voltage applied and an accelerated, fast start-up of the drive motor 6, the two ratchets 8 are radially moved outward by the centrifugal force so that they simultaneously disengage. The individual centres of mass of all radially movable parts 4, 5, 8, 11 here are arranged symmetrically to each other and are on one symmetry axis 16. Overall this leads to a very low-noise operation of a shutter and increases the service life, because as a result of the two ratchets 8 and their simultaneous stop on the locking abutments 9 the forces decrease and the wear on the locking abutments 9 and ratchets 8 decreases. In addition, there is then always enough space for the starting and lifting of the ratchets 8. The diameter of the ratchets 8, i.e. their internal diameter, is greater than the diameter of locking disc 1.

Additionally, the locking abutment surfaces of the locking abutment(s) 9 and the ratchet(s) 8 can be designed such for the centrifugal positive locking brake for shutter drives that dovetail operation occurs. This leads to the ratchet(s) 8 being drawn radially inward to the locking abutment(s) 9 until they are on the outside surface of locking disc 1 and thus remain permanently secured in this position.

Figure 3:
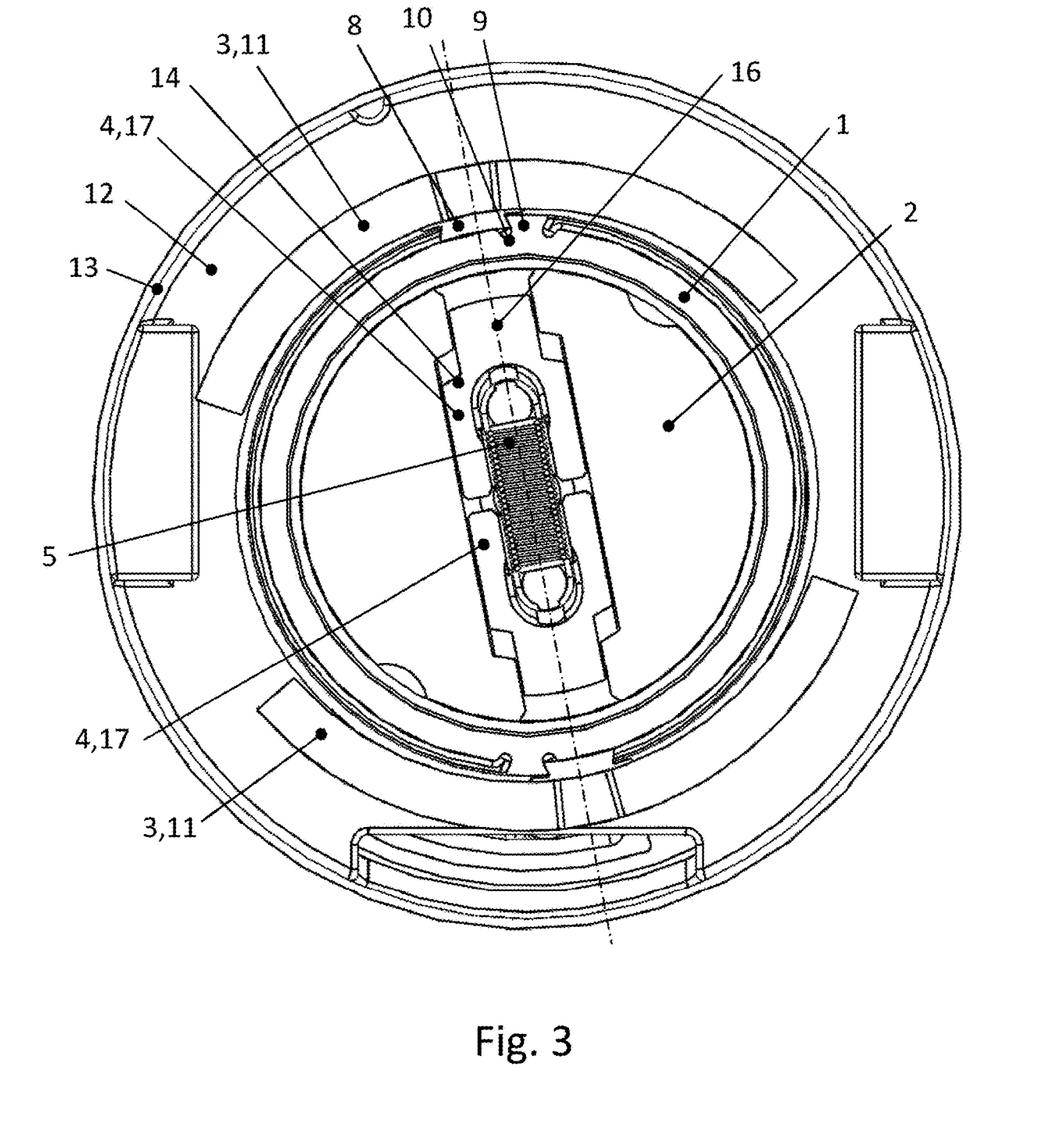
FIG. 3 shows a front view of the centrifugal positive locking brake in closed position.

FIG. 3 shows a front view of the centrifugal positive locking brake in closed position, i.e. the two ratchets 8 each engage into one oblique-radially protruding surface of the locking abutments 9 when the drive motor 6 is in the de-energized state. Due to preloading, the spring 5 causes all precisely symmetrically arranged, radially moveable parts to be drawn radially inward, such as the central spring element 4 with the internally disposed spring 5 and the two spring forks 17, with ratchets 8 arranged on the shanks of the spring forks 17 and the centrifugal blocks 3 and centrifugal block parts 11. The wedge-shaped abutment 14 is not engaged, and now a defined distance exists between the wedge-shaped surfaces of the recess of the turntable 2 and the wedge-shaped shoulders of the spring forks 17. All radially moveable parts are dimensioned and tailored to each other such that the centres of mass of all radially movable parts are on the symmetry axis 16. The locking disc 1 with the locking abutments 9 connected to the frame 12 and the entire centrifugal positive locking brake is surrounded by a tubular housing 13. This is made, for example, as a slideable protective sleeve and reliably protects against dirt and climatic influences.

Figure 4:
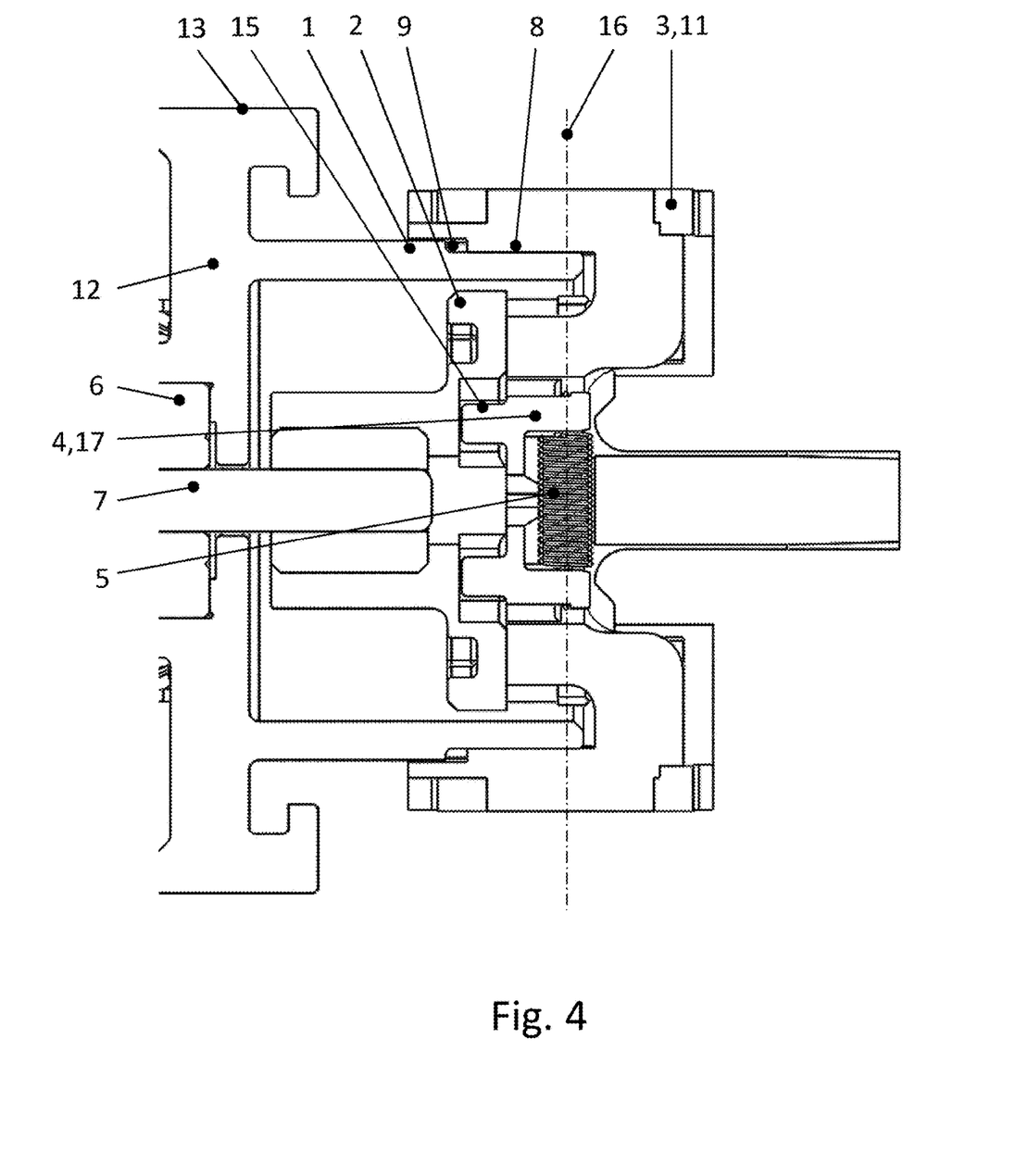
FIG. 4 shows a side sectional view of the centrifugal positive locking brake in closed position.

FIG. 4 shows a sectional side view along the symmetry axis 16 of the centrifugal positive locking brake in closed position. Inside the frame 12, the stator of the drive motor 6 is materially connected with the outside of the locking disc 1. The rotor of the drive motor 6 is seated on the drive shaft 7, on which the turntable 2 is press-fitted. The locking disc 1 is overarched by the ratchets 8 to which the centrifugal blocks 3 or the centrifugal block parts 11 are firmly connected. The ratchets 8, which are drawn inward by the preloaded spring 5, touch the radially outward-protruding surfaces of the locking abutments 9, i.e. they engage because there are no centrifugal forces. The dovetail operation prevents automatic release of the shutter. All radially movable parts such as the two centrifugal blocks 3 or the centrifugal block parts 11, the ratchets 8, the central spring element 4 consisting of the two spring forks 17 with the preloaded spring 5 disposed inside and the further abutments 14 and 15 disposed on the spring forks, whereby abutment 14 restricts the radial movement and abutment 15 causes an axial support, are dimensioned and matched in mass with respect to each other so that the centres of mass of all rotatably movable parts are located exactly on the symmetry axis 16. The pin-like abutments 15 engage in a further small groove-like recess of the turntable 2, acting as a further end abutment for the radial movement of the parts, both inwards and outwards. They also prevent the moveable parts from twisting during motor operation and ensure centring of all rotating parts in the centrifugal positive locking brake. A protective sleeve is fitted to the tubular housing 13 (not shown).

In a specific design of the method according to the invention using a centrifugal positive locking brake for shutter drives, if the turntable 2 is blocked, it is initially accelerated by drive motor 6 against the selected direction until the ratchet(s) 8 lift off, then there is a quick reversal of direction by switching the drive motor 6 as quickly as possible so that the ratchet(s) 8 with the centrifugal blocks 3 or centrifugal block parts 11 disposed on them remain open during the switching and during movement because of their inertia until the shutter is stopped.

In another variant of the method using a centrifugal positive locking brake for shutter drives, the drive motor 6 initially rotates the turntable 2 slowly against the selected direction. Then, before or at the latest upon reaching another abutment the drive motor 6 is switched, and then turntable 2 is accelerated by a specific control of drive motor 6 with high acceleration in the direction of movement so that the ratchet(s) 8 and the centrifugal blocks 3 or centrifugal block parts 11 are moved radially outward by the centrifugal force, rise and remain open until the shutter is stopped.

A design is also conceivable, where for the method using a centrifugal positive locking brake for shutter drives the drive motor 6 slowly turns the turntable 2 against the selected direction of movement until the turntable 2 is blocked by the abutment of the ratchet(s) engaging in another abutment, then the drive motor 6 is switched and only then is the turntable 2 accelerated with high acceleration in the direction of movement. Here the ratchet(s) 8 and the centrifugal blocks 3 or centrifugal block parts 11 are moved radially outward by the centrifugal force and remain opened during the movement process until the shutter is stopped.

If a specially designed drive motor 6 is installed in the shutter and the rotor of the drive motor 6 can be turned to a specific position by an applied current pattern, the ratchet(s) 8 can also be moved by this control process to a defined start position using a centrifugal positive locking brake, then making it directly possible to move turntable 2 in a direction with high acceleration immediately without switching, whereby the ratchet(s) 8 and the centrifugal blocks 3 or centrifugal block parts 11 radially lift off so far by the centrifugal force that the ratchet(s) 8 cannot hit a locking abutment 9 and remain open while the shutter is being operated until the shutter stops.

In a special design of the method using a centrifugal positive locking brake for shutter drives, first of all, while the turntable 2 is at rest, the position of the ratchet(s) 8 is determined before or while the drive motor 6 is energized, although it is not yet started. Then, depending on the determined position, i.e. if the distance from the locking abutment is correspondingly sufficient and the ratchet(s) 8 can lift off radially before the locking abutment is reached in the direction of movement when the turntable 2 is rotating, the turntable 2 accelerates directly in the direction of movement with high acceleration because of the appropriate control of the drive motor 6 so that the shutter can be moved in the direction of movement without the ratchet(s) 8 engaging. Or, depending on the position of the at-rest ratchet(s) 8, i.e. if the distance from the locking abutment is not enough, it first rotates against the direction of movement, then the drive motor 6 is switched upon reaching a specific position, the turntable 2 is accelerated in the direction of movement with high acceleration, whereby the ratchet(s) 8 and the centrifugal blocks 3 or centrifugal block parts 11 lift off radially and remain open and the locking abutment(s) 9 are permanently passed during the movement process until the movement process of the shutter is stopped and the ratchet(s) 8 re-engage.

The invention relates to a centrifugal positive locking brake and a related method for the optimized control of a centrifugal positive locking brake for shutter drives for different sizes and for different drive motor powers.

LIST OF REFERENCE SYMBOLS

1 Locking disc
2 Turntable
3 Centrifugal blocks
4 Central spring element
5 Spring
6 Drive motor
7 Drive/output shaft
8 Ratchet
9 Locking abutment
10 Recesses
11 Centrifugal block parts
12 Frame
13 Tubular housing/protective sleeve
14 Inner abutment, radial clamping abutment
15 Inner abutment, end abutment
16 Symmetry axis
17 Spring forks

The invention claimed is:

1. A centrifugal positive locking brake for shutter drives, comprising centrifugal blocks, at least one spring (5), a drive motor (6) disposed in a tubular housing (13), and a drive/output shaft (7),
   wherein a turntable (2) is coupled with the drive/output shaft (7) of the drive motor (6),
   a central spring element (4) having the least one spring (5) disposed inside is centrifugally guided in a guide of the turntable (2),
   wherein each spring (5) is connected with a radially movable engaging locking element which is guided in the turntable (2),
   on the central spring element (4) there are radially impacting inner abutments (14, 15),
   which move against abutments in the turntable (2),
   characterized in that at least one ratchet (8) is disposed on each spring element (4),
   each ratchet (8) has a centrifugal block (3) fastened to it, which is formed as a single part or as two centrifugal block parts (11),
   when the drive motor (6) is de-energized, at least one ratchet (8) engages a locking abutment (9) of a locking disc (1),
   when voltage is applied and the drive motor (6) starts, the ratchet(s) (8) disengage.

2. The centrifugal positive locking brake for shutter drives according to claim 1, characterized in that two or four locking abutments (9) are formed on the locking disc (1).

3. The centrifugal positive locking brake for shutter drives according to claim 1, characterized in that two or four ratchets (8) are arranged centrally symmetrically or equally distributed on the radius relative to one or two central springs (4).

4. The centrifugal positive locking brake for shutter drives according to claim 1,
   wherein in a recess in the turntable (2) the central spring element (4) is centrifugally guided, inside which is the spring (5),
   characterized in that either side of the spring (5) is connected with the radially movable ratchet (8) which is guided in the turntable (2), each ratchet (8) has the centrifugal block (3) or centrifugal block parts (11) fastened to it, on the locking disc (1) there are fastened two symmetrically opposite locking abutments (9),
   when the drive motor (6) is de-energized, the ratchets (8) positively engage the two locking abutments (9) of the locking disc (1) secured to the frame,
   when voltage is applied and the drive motor (6) starts, the two ratchets (8) disengage, the individual centres of mass of all radially movable parts (4, 5, 8, 11) being on one symmetry axis (16).

5. The centrifugal positive locking brake for shutter drives according to claim 1, characterized in that the diameter of the ratchets (8) is greater than the diameter of the locking disc (1).

6. The centrifugal positive locking brake for shutter drives according to claim 1, characterized in that the locking abutment surfaces of the locking abutment(s) (9) and the ratchet(s) (8) are designed to be inclined such that dovetail operation occurs.

7. The centrifugal positive locking brake for shutter drives according to claim 1, characterized in that the surfaces of the locking abutment(s) (9) and/or the ratchet(s) (8) have a noise-damping design.

8. A method using a centrifugal positive locking brake for shutter drives according to claim 1, characterized in that the unlocking of the positive locking mechanism takes place either as a result of an extremely accelerated start-up movement of the turntable (2) using a targeted specific control of the drive motor (6), or, if required, depending on the position of the ratchet(s) (8), there is an accelerated reversal of direction of the drive motor (6), whereby the ratchet(s) (8) with the centrifugal blocks (3) or centrifugal block parts (11) move outward and are disengaged and because of the centrifugal force do not return inward to the engaged position and remain in the disengaged position until the shutter stops.

9. The method using a centrifugal positive locking brake for shutter drives according to claim 8, characterized in that when the turntable (2) is blocked, it is quickly accelerated by the drive motor (6) against the direction of movement until the ratchet(s) (8) lift off, then the direction of rotation is reversed quickly so that the ratchet(s) (8) with the centrifugal blocks (3) or centrifugal block parts (11) remain open due to their inertia until the shutter is stopped.

10. The method using a centrifugal positive locking brake for shutter drives according to claim 8, characterized in that the drive motor (6) slowly rotates the turntable (2) against the selected direction of movement, the drive motor (6) is switched before or at the latest upon reaching another abutment, only then is it accelerated with high acceleration in the direction of movement, whereby the ratchets(s) (8) and the centrifugal blocks (3) or centrifugal block parts (11) lift off because of the centrifugal force and remain open until the shutter is stopped.

11. The method using a centrifugal positive locking brake for shutter drives according to claim 8, characterized in that the drive motor (6) slowly rotates the turntable (2) against the selected direction of movement until the turntable (2) is blocked by the ratchet(s) engaging in another locking abutment, the drive motor (6) is switched, then the turntable (2) is accelerated with high acceleration in the direction of movement, whereby the ratchets(s) (8) and the centrifugal blocks (3) or centrifugal block parts (11) lift off because of the centrifugal force and remain open until the shutter is stopped.

12. The method using a centrifugal positive locking brake for shutter drives according claim 8, characterized in that the drive motor (6) is rotated to a specific position by an applied current pattern and is accelerated directly in the direction of movement with high acceleration, whereby the ratchets(s) (8) and the centrifugal blocks (3) or centrifugal block parts (11) lift off because of the centrifugal force and remain open until the shutter is stopped.

13. Method using a centrifugal positive locking brake for shutter drives according to claim 8, characterized in that the position of the ratchet(s) is detected before or upon switching on the power supply to the drive motor (6), and depending on the position, using appropriate controls of the drive motor (6) the turntable (2) is accelerated directly in the direction of movement with high acceleration, or is first rotated against the direction of movement, then the drive motor (6) is switched when a specific position is reached, the turntable (2) is accelerated in the direction of movement with high acceleration, whereby the ratchets(s) (8) and the centrifugal blocks (3) or centrifugal block parts (11) lift off because of the centrifugal force and remain open until the shutter is stopped.

\* \* \* \* \*